(12) United States Patent
Chambliss (10) Patent No.: US 9,009,424 B2
(45) Date of Patent: Apr. 14, 2015

(54) DATA PLACEMENT FOR LOSS PROTECTION IN A STORAGE SYSTEM

(71) Applicant: International Business Machines Corporation, Armonk, NY (US)

(72) Inventor: David D. Chambliss, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 13/663,299

(22) Filed: Oct. 29, 2012

(65) Prior Publication Data

US 2014/0122795 A1    May 1, 2014

(51) Int. Cl.
G06F 12/00    (2006.01)
G06F 12/16    (2006.01)

(52) U.S. Cl.
CPC ................................. *G06F 12/16* (2013.01)

(58) Field of Classification Search
USPC .................................. 711/114, 154, 170, 209
See application file for complete search history.

(56) References Cited

U.S. PATENT DOCUMENTS

| | | | |
|---|---|---|---|
| 6,425,052 B1 | 7/2002 | Hashemi | |
| 6,871,219 B2 | 3/2005 | Noordergraaf et al. | |
| 7,222,119 B1 | 5/2007 | Ghemawat et al. | |
| 7,418,621 B2 | 8/2008 | Ashmore | |
| 7,565,569 B2 | 7/2009 | Zohar et al. | |
| 7,779,224 B2 | 8/2010 | Zohar et al. | |
| 7,836,250 B2 | 11/2010 | Zohar et al. | |
| 7,908,413 B2 | 3/2011 | Zohar et al. | |
| 8,015,437 B2 | 9/2011 | Zohar et al. | |
| 8,112,553 B2 | 2/2012 | Zohar et al. | |
| 2003/0037061 A1* | 2/2003 | Sastri et al. | 707/103 R |
| 2005/0154841 A1* | 7/2005 | Sastri et al. | 711/148 |
| 2006/0129738 A1 | 6/2006 | Zohar et al. | |
| 2006/0129783 A1 | 6/2006 | Zohar et al. | |
| 2011/0280404 A1* | 11/2011 | Jennas et al. | 380/278 |

OTHER PUBLICATIONS

IBM, "Improving the Availability and Reliability of Scale Out Storage with Hierarchical Clusters", IP.COM Prior Art Database Disclosure, Nov. 3, 2008, 5 pp., United States.

* cited by examiner

*Primary Examiner* — Reba I Elmore
(74) *Attorney, Agent, or Firm* — Sherman IP LLP; Kenneth L. Sherman; Steven Laut (57) ABSTRACT

Embodiments of the invention relate to data placement for loss protection in a storage system. One embodiment includes constructing multiple logical compartments. Each logical compartment includes a placement policy including a set of storage placement rules for placement of storage symbols into a set of physical storage containers. A first logical compartment of said plurality of logical compartments is container-overlapped with respect to a second logical compartment of said plurality of logical compartments. The first logical compartment is data loss independent with respect to the second logical compartment. Each of multiple storage volumes is associated with a logical compartment. The storage symbols that represent a data stripe are placed onto physical storage containers in conformity with the placement policy associated with the logical compartment containing the data stripe.

20 Claims, 7 Drawing Sheets

DATA PLACEMENT FOR LOSS PROTECTION IN A STORAGE SYSTEM

BACKGROUND

Embodiments of the invention relate to storage system loss prevention, and in particular, data placement with compartmentation against data loss from storage device failures.

Storage systems incorporate some form of protection against data loss. One form of protection against data loss is redundant data storage, for example redundant array of independent disks (RAID) schemes. If the physical bits stored on a single disk are lost, the surviving physical bits on other disks either contain a copy of the lost data or are sufficient for a mathematical recalculation of the lost data. Thus, the data stored by the system has not been lost even when some physical bits have been lost. Loss of data may occur if enough physical bits are lost so as to exceed the degree of protection provided by the redundant data storage.

When some data loss has been experienced, the impact of the loss on the data owner depends on which parts of the data have not been lost. Some distributions of the data loss cause greater harm to the data owner than others, and it is an objective in the system to keep that harm small. Another objective is to maximize the performance that is offered for storage and retrieval of data both in the absence of any data loss event and subsequent to a data loss event.

BRIEF SUMMARY

Embodiments of the invention relate to data placement for loss protection in a storage system, where data is stored as physical bits spread over multiple physical containers. One embodiment includes constructing multiple logical compartments. Each logical compartment includes placement policy including a set of storage placement rules for placement of storage symbols into a set of physical storage containers. A first logical compartment of the multiple logical compartments is container-overlapped with respect to a second logical compartment of the multiple logical compartments. The first logical compartment is data loss independent with respect to the second logical compartment. Each of multiple storage volumes is associated with a logical compartment. The storage symbols that represent a data stripe are placed onto physical storage containers in conformity with the placement policy associated with the logical compartment containing the data stripe.

Another embodiment comprises a computer program product for loss protection in a storage system. The computer program product includes a computer readable storage medium having computer readable program code embodied therewith. The computer readable program code configured to construct a plurality of logical compartments, each logical compartment comprising a placement policy including a set of storage placement rules for placement of storage symbols into a set of physical storage containers. A first logical compartment of the plurality of logical compartments is container-overlapped with respect to a second logical compartment of the plurality of logical compartments. The first logical compartment is data loss independent with respect to the second logical compartment. The computer readable program code is further configured to associate each of a plurality of storage volumes with a logical compartment, and to place the storage symbols that represent a data stripe onto physical storage containers in conformity with the placement policy associated with the logical compartment containing the data stripe.

One embodiment comprises a storage system. The storage system comprises a storage controller that constructs a plurality of logical compartments in one or more memory devices. Each logical compartment comprises a placement policy including a set of storage placement rules for placement of storage symbols into a set of physical storage containers in the storage system. A first logical compartment of the plurality of storage compartments is container-overlapped with respect to a second logical compartment of the plurality of storage compartments. The first logical compartment is data loss independent with respect to the second logical compartment. The storage controller further associates each of a plurality of storage volumes with a logical compartment, and places the storage symbols that represent a data stripe onto physical storage containers in conformity with the placement policy associated with the logical compartment containing the data stripe.

These and other features, aspects and advantages of the present invention will become understood with reference to the following description, appended claims and accompanying figures.

DETAILED DESCRIPTION

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
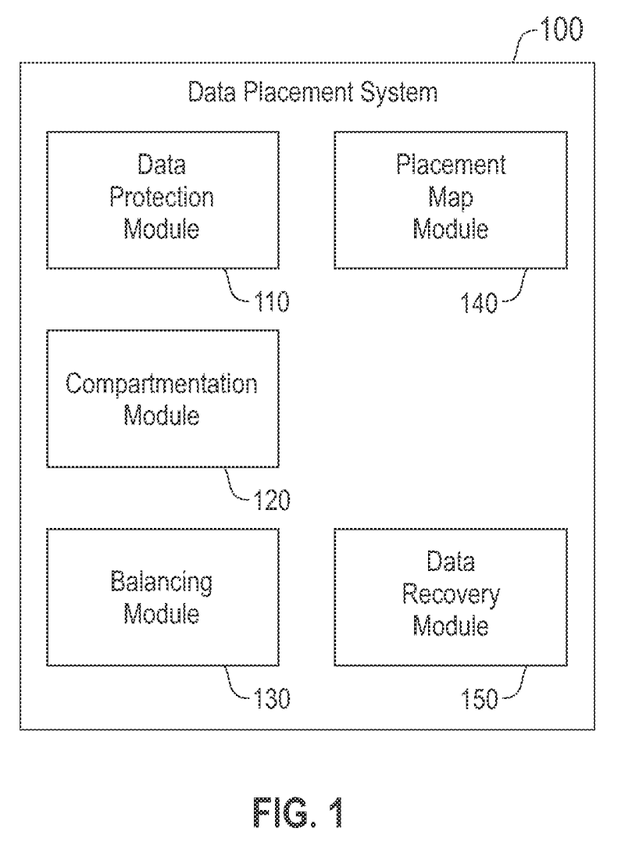
FIG. 1 illustrates a block diagram of a system utilizing data placement for loss protection, in accordance with an embodiment of the invention.

Referring now to the drawings, FIG. 1 illustrates a system 100 for data placement in physical storage containers for data loss protection according to one embodiment of the invention. In one embodiment, a data placement process for loss protection implemented by the system 100 comprises restricting storage of data in multiple physical storage containers for any stripe of a volume within a logical compartment based on a compartmentation policy and selecting particular physical storage containers for storing a particular stripe of a volume based on a balancing policy for the multiple physical storage containers. Compartmentation refers to minimizing the impact of data loss by distribution of data. If a given amount of data loss is to occur, it is preferable that the losses be concentrated in a small number of storage volumes, where each volume loses a larger fraction of their data, and other volumes suffer no loss of data at all, rather than spreading data uniformly over all volumes. In one example, data is migrated after a failure of one or more physical storage containers based on a new compartmentation policy and new balancing policy.

The data placement process achieves the objectives of data protection, compartmentation, and balance. Data protection means that the failure or loss of one of the physical storage containers does not cause the loss of any of the user data which is stored and retrieved by the system 100. The fault tolerance level of the data placement is the number of physical storage containers whose loss can be absorbed without loss of any user data. More precisely, among all circumstances consisting of one or more physical storage container losses, which cause data loss that cannot be recovered through the operation of the coding scheme, the distance of the coding scheme is the smallest number of container losses among those circumstances and the fault tolerance level is the distance minus one. In one embodiment, the fault tolerance level is one (1). In other embodiments, the fault tolerance level may be greater than 1.

In one example, an error correction code is used to achieve fault tolerance in data placement by system 100. The user data includes a set of user symbols. In some embodiments, a user symbol comprises any value that may be represented with a single bit (binary digit), or with a word containing a fixed number of bits, such as 8, 16, 32, 64, or 128, or with a page containing a larger number of bits, which may be fixed or variable. In one example, the user symbols are grouped into stripes, each symbol contained in at least one stripe. In one embodiment, there is exactly one stripe containing each symbol. Each stripe may be represented as a set of storage symbols and those storage symbols are stored in physical storage containers. In some embodiments, a storage symbol may be any value that can be represented with a single bit (binary digit), with a word containing a fixed number of bits such as 8, 16, 32, 64, or 128, or with a page containing a larger number of bits which may be fixed or variable.

In one example, system 100 provides procedures that are specified for which storage symbols are derived from user symbols of a stripe, and by which user symbols may be derived from some or all of the storage symbols of the stripe. The procedures are known as the coding scheme for the stripe. In one embodiment, the coding scheme may correct for erasures, meaning that all user symbols may be extracted upon not all of the storage symbols being available. In one example, the coding scheme is able to detect and correct for errors, meaning that all user symbols may be extracted when some of the available storage symbols have incorrect values.

In one class of error correction code examples, user symbols and storage symbols consist of pages of bits all containing the same number. In one such example a stripe contains one user symbol and is stored as two or more storage symbols, each of which is separately sufficient to reproduce the user symbol. When the number of storage symbols is 2 this coding scheme is known as RAID-1 or replication. When the number of storage symbols is 3, this coding scheme is known as triplication. As another example, a stripe contains a number n of user symbols and the storage symbols for the stripe comprise the n user symbols together with k parity symbols computed mathematically from the user symbols. In one such example known as RAID-5, the value of k is 1. In another example known as RAID-6, the value of k is greater than 1. In some embodiments, the above described or any other coding schemes may be used to achieve data protection in the storage of stripes by system 100.

In one example, the storage symbols that represent one stripe are not all stored on the same physical storage container. In one embodiment, system 100 provides that each storage symbol from one stripe is stored on a different physical storage container. In another embodiment, certain combinations of storage symbols are permitted to be stored on the same physical storage container, but the operation of the system 100 ensures that certain combinations of storage symbols are not stored on the same physical storage container. In one example, associated with the coding scheme are rules constraining which storage symbols are permitted to be stored on the same physical container. In one embodiment, it is a mathematical property of the error correction codes that the fault tolerance level is less than the number of physical storage containers used to store the storage symbols of one stripe.

A physical storage container is an identified subset of the capacity for the system 100 to store and retrieve storage symbols. In some embodiments, a physical storage container may be one disk drive, a set of disk drives, a part of the space in one disk drive, a magnetic tape, a memory module, a set of memory modules, a flash device, a set of flash devices, other units intended for data storage, etc. To achieve maximum benefits, in one embodiment it is advantageous if a physical storage container has the property known as a failure domain. This means that there are possible events that would cause the loss or corruption of a substantial number of symbols stored within one physical storage container, while leaving intact the symbols that are not stored in the physical storage container. In one example, a disk drive has this property because there are failure modes that make all data in one drive inaccessible without affecting other drives. When a failure domain is known, there is substantial value in ensuring that data will be protected in the event of simultaneous loss of all symbols stored in that failure domain.

Data protection provides a first benefit of ensuring that no user data is lost when events cause the loss of some storage symbols provided that the total of the number of physical storage containers lost and the number of additional storage symbols lost is not greater than the fault tolerance level. In some embodiments, system 100 provides an extension of the first benefit to protect data against storage symbols that are corrupted but not lost. When events cause loss of storage symbols that exceeds the system-wide fault tolerance level, data protection provides a second benefit of reducing the amount of data lost. The second benefit arises because a stripe will not lose any user data if the number of storage symbols lost from it does not exceed the stripe's fault tolerance level. When storage symbols are lost, some stripes will lose more storage symbols than others and, as a result, some stripes in the system will be able to preserve all of their user symbols.

Embodiments of the invention using system 100 provide an additional benefit over existing data protection systems that use error correction by achieving compartmentation and balance. In one example, compartmentation provides an added benefit because in many circumstances that cause loss of some user data, most of the volumes are preserved for use, whereas a system without the added benefits of the embodiments of the invention would cause loss of some data from every volume and loss of the benefits from all volumes.

In one example, the objective of compartmentation is achieved by system 100 by associating each user symbol that is being stored with a logical compartment, by associating the logical compartment with a placement policy, and by ensuring that the placement of storage symbols for the stripe containing the user symbol conforms to the placement policy. In one embodiment, the placement policy incorporates the protection policy, which comprises the coding scheme and the rules associated with it on which storage symbols must be placed on separate physical storage containers. In one example, a placement is a specification of which specific physical storage container is used to store each storage symbol. A placement policy is a procedure or rule that determines which placements are permitted. In some embodiments, the placement policy may be realized using, for example, a tabulated list of placements, a list of placement groups from which a list of placements may be generated, a function that evaluates to a true value if the supplied placement or placement group is permitted, and false if not, a procedure that generates one or more permitted placements, or another object(s).

In one embodiment, multiple logical compartments are used in the system 100, where each logical compartment is associated with a placement policy. In one example, one logical compartment being container-overlapped with another logical compartment, also has the property of being data loss independent. The container-overlapped property means that the policies for both logical compartments are able to make use of at least some of the same physical storage containers. In one example, a first logical compartment is container-overlapped with respect to a second logical compartment if there is a first placement of storage symbols for a stripe in conformity with the placement policy of the first logical compartment and a second placement of storage symbols for a stripe in conformity with the placement policy of the second logical compartment. In this example, there is a physical storage container onto which the first placement causes at least one storage symbol to be placed and additionally such that the second placement causes at least one storage symbol to be placed onto the physical storage container. In one embodiment, the container-overlapped property is necessary for achieving the balance objective of the system 100.

In one example, overlap on a single container is sufficient to provide container-overlap and makes possible some balance improvements compared to a non-container-overlapped case, however, greater container overlaps make for better balance. In one embodiment, a first logical compartment and a second logical compartment are majority-container-overlapped, which means that the number of physical storage containers having use permitted by policies of both compartments is greater than the number of physical containers having use permitted by the placement policy of the second logical compartment, but not permitted by the placement policy of the first logical compartment.

In one embodiment, a first logical compartment and a second logical compartment are fully container-overlapped, which means that the set of physical storage containers having use permitted by the placement policy of the first logical compartment is equal to the set of physical storage containers having use permitted by the placement policy of the second logical compartment. In one embodiment, the degree of resource overlap changes over time as policies are adjusted to accommodate hardware changes.

The data loss independence property means that events causing loss of data stored with one policy do not always cause loss of data stored with the other. In one example, system 100 provides that a first logical compartment is data loss independent with respect to a second logical compartment if there is a possible circumstance consisting of the loss of physical storage containers, such that stripes stored in conformity with the placement policy of the first logical compartment do suffer data loss, but stripes stored in conformity with the placement policy of the second logical compartment do not suffer any data loss. In one embodiment, to achieve maximum benefits of data loss independence, it is advantageous if the property of data loss independence for a given circumstance is strong, meaning that data loss only occurs for one of the logical compartments, and stripes of any of the other logical compartments suffer no data loss. It is also advantageous if a strong property of data loss independence applies to all of the most likely circumstances that lead to data loss. In some embodiments, the placement policy provided for a given logical compartment may be changed or become changed based on system circumstances. In one example, data loss independence may mean that the actual storage of the data conforms to the policy, or what applies if the data were conformant to the policy.

To maximize compartmentation benefits, in one embodiment it is generally advantageous if system 100 provides that the user data is organized into volumes and a single placement policy applies to all user symbols in the volume. In one example, it may sometimes be necessary or desirable for different user symbols in the same volume to be associated with different placement policies. This example may be described as associating the volume as a whole with a combined placement policy, which is a combination of the multiplicity of policies that apply to its different symbols. The combined placement policy permits all placements permitted by any of the multiplicity of policies. Combining policies in this way generally reduces the strength of compartmentation, as compared with applying only one of the original policies. The reduction is less if there are relatively few policies combined. Different system criteria may, however, dictate the requirement to accept reduced strength of compartmentation (e.g., latency, storage costs, performance, etc.).

A volume is an identified logical container for a subset of user symbols stored and retrieved by the system 100. In some embodiments, system 100 provides the protocols for performing operations of storing and retrieving user data include communicating the identifier for each user symbol being operated on. In one example, a volume may comprise a small computer system interface (SCSI) logical unit, a file, a directory in a file system, a file system, a count key data (CKD) volume, a SCSI storage object, or any other logical data container. In one embodiment, the identity of a volume for a symbol is inferred from identifiers or properties of the symbols being operated on. In one example, a volume may be a collection of extents or address ranges within a file, within a SCSI logical unit, within a SCSI storage object, a storage pool used to hold data selected by classification rules on the content, etc.

In one embodiment, in order to maximize benefits of compartmentation, it is advantageous if a volume has the property of being useful in isolation. In one example, this means that there is substantial value gained if no user data is lost from the volume even in a circumstance when data has been lost from other volumes, and a substantial part of that value would be lost if data were lost from the volume. In one implementation, system 100 may provide for storing a plurality of file systems in a system, such as a data center. Loss of a small part of the data from a first file system may render that file system useless or substantially reduce the value of any data in that file system that is not lost, but the value of a second file system may be unaffected by the loss of any or all data from the first file system. When every symbol in a volume is associated with the same first placement policy, then there are potential circumstances of data loss which cause data loss in a second placement policy, but not in the first placement policy. In such circumstances, the volume experiences no data loss and the benefits of using the volume are not lost.

In another example, two volumes may be useful separately to achieve substantially similar ends, such as one volume may be a backup for the other volume. In one example, one volume may contain database tables and the other volume may contain the log from which the tables could be rebuilt. Although losing one volume may be harmful, the harm of losing one volume but not the other is less than the harm of losing both volumes. In one embodiment, there is considerable benefit in storing the volumes in separate logical compartments that are data loss independent.

In one embodiment, when user symbols are to be stored, user system 100 provides that the symbols associated with the same placement policy are collected in a stripe. A stripe may contain one user symbol or more than one user symbol. The protection policy contained in the placement policy determines how many different physical storage containers must be used to store the storage symbols used by the coding scheme to represent the data of the stripe. The placement policy determines which subsets of physical storage containers are permitted to be used to store the storage symbols. In one example, for a given placement policy, some combinations of physical storage containers are disallowed for use. In this example, the disallowance is a necessary condition for the placement policies to have the property of data loss independence.

In a RAID system, the physical storage containers (disk drives) are grouped into ranks, with each disk drive belonging to exactly one rank. Each volume is stored exclusively on a single rank according to the protection policy for that rank. If disk failures occur on one rank beyond the fault tolerance level, then only volumes stored on that rank are affected. While circumstances exist in which losses occur on multiple ranks, each of the most likely circumstances for data loss effects one rank only. Unlike traditional systems, in one embodiment system 100 incorporates placement policies, which are container-overlapped. Traditional systems, such as RAID systems, do not achieve the objective of balance and its benefits, for which the container-overlapped property is required.

The objective of balance is that the usage of physical storage containers be distributed substantially evenly, in proportion to the capacity of each. Usage of a physical storage container refers both to capacity usage and performance usage. Capacity usage means occupying part or all of the storage capacity of the physical storage container. Performance usage means, any given time, consuming part of the resources needed to store and retrieve symbols on the physical storage container. Balance in capacity usage is advantageous because storage write operations will not fail due to full physical storage containers until the total system capacity is nearly exhausted. Balance in performance usage is advantageous because performance of operations will not suffer from resource saturation until the total operational load is close to the total system performance capacity. In a typical computer system, different applications that use different data sets may start and stop independently at different times, so balance in performance usage at one point in time does not in itself guarantee balance at other times. An effective means to achieve balance in performance usage at all times is for each volume to be distributed approximately uniformly among all the physical storage containers. A benefit of distributing each volume in a balanced way is that a single application focused on a single volume has the opportunity to achieve the full throughput possible from all of the physical storage containers. This benefit may be described as full scale-out performance.

The property and benefits of balance are achieved by RAID systems by using single large ranks, wide striping, or declustered RAID. If all data is stored on a single large rank spanning all disks then balance is achieved, but compartmentation is not, and in a large system there are enough other disadvantages that this is rarely chosen. Wide striping refers to spreading data from each volume across multiple ranks of a conventional RAID system, using an additional layer of RAID or virtualization above the ranks. That approach achieves balance but not compartmentation and has additional disadvantages. In declustered RAID, virtual ranks are assembled from many overlapping subsets of the set of all disks, so that each disk may be a member of many virtual ranks; and a form of wide striping distributes data from each volume across all the virtual ranks. A virtual rank is not a rank as used in conventional RAID, but it has some of the same attributes and usages. Declustered RAID achieves balance but not compartmentation. These typical systems do not incorporate multiple placement policies with data loss independence as provided by system 100.

In one embodiment, each placement policy may include a balance policy which is used to determine which placement among permitted placements is to be used for storing the storage symbols for a given stripe. The balance policy selects among the set of placements that are permitted by the compartmentation aspect of the placement policy. In one example, it is advantageous if the balance policy is constructed so as to achieve balance for each volume among all physical storage containers usable within the placement policy.

In one embodiment, all pages in a stripe are stored on physical storage containers based on a protection policy. In one example, each compartment is associated with a data placement policy that applies to each volume within a compartment. In another example, the compartmentation policy comprises restricting use of a pair of physical storage containers by only one compartment. In one embodiment, orderly restoration of storage properties, after a loss of a disk, is provided by an orderly reformulation of placement policies and a movement of data. The orderly restoration restores data protection at previous levels, balanced distribution and compartmentation.

As shown in FIG. 1, in one embodiment system 100 includes a data protection module 110, a compartmentation module 120, a balancing module 130, a placement map module 140 and a data recovery module 150. In one example, the data protection module 110, the compartmentation module 120, and the balancing module 130 generate a set of data placement policies for a set of physical storage containers, also simply called containers (e.g., storage disks, storage tapes, etc.), where each policy is regarded as a separate logical compartment. In one example, each data placement policy includes a data protection policy, a data compartmentation policy and a data balancing policy. In one embodiment, each volume of a container is only associated with a single logical compartment. In one example, each logical compartment includes all of the containers in the system, meaning that the placement policy of the logical compartment includes a permitted placement that places a storage symbol on the container. In one example, the compartmentation module 120 uses a compartmentation policy for each logical compartment and the balancing module 130 uses a balancing policy for spreading data from the volumes from each logical compartment evenly across all of the containers. The placement policy prescribes which combinations of containers may be used in storing a stripe of data that are connected by one or more protection computations applied by the data protection module 130.

In one example for two-way replication, the placement policy specifies which pairs of containers are allowed to hold the primary and secondary copies of a given fragment of a volume's data.

In the two-way replication example, the placement policies of two separate logical compartments are constructed such that the two separate logical compartments have no disk pairs in common. That is, if the placement policy for compartment P permits primary and secondary copies of a given fragment to be placed on containers d and d' (in either order) by the balancing module 130, then no other compartment P' permits that same placement. This creates a strong data loss independence property for the two separate logical compartments. In this example, if the aforementioned containers d and d' were to fail, leading to data loss, then only data from compartment P would be lost. For all other compartments P', at least one surviving copy of all data is provided. This achieves full scale-out performance because a storage workload to any volume is distributed in a balanced way across all containers based on the compartmentation and balancing policies. Therefore, compartmentation is achieved, and if data loss occurs, it would impact a reduced fraction of storage volumes as compared to simply spreading data evenly across all containers without using the restrictions applied by the compartmentation module 120.

In one embodiment, each volume is divided into fixed-size pages by the compartmentation module 120. In one example, the fixed size may be 4 megabytes. In other examples, the fixed size of the pages may be other sizes, such as 6 megabytes, 8 megabytes, etc.). The volume pages are the user symbols, and they are grouped and mapped to groups of on-container (e.g., on-disk, on-tape, etc.) pages, which are the storage symbols, according to the coding scheme implemented by the data protection module 110. In one example, for simple replication the group has only one volume page, which maps to two on-container pages named the primary and secondary for that group. According to one example, for parity-based RAID, a group of n volume pages are mapped into N=n+q on-container pages by the data protection module 110, where q is the number of protective parity pages (e.g., q=1 in RAID-5). In one implementation, the group is considered a stripe. For replication (also referred to as RAID-1), a stripe of size N=2 is used with n=q=1.

In one embodiment, the data placement is tabulated, in the sense that the location of each on-container page on its particular container is recorded in a table referred to as a placement map by the placement map module 140. In one example, the placement map is maintained as system metadata. In one implementation, provisions for changing the placement of pages during operation of the system 100, where the balancing module 130 reads data from one container and writes to another container. The placement changes are reflected as changes in the placement map, and changes in the placement map may be used to control the data movements that effect the changes. In one example, the tabulated placement may be unconstrained (e.g., every page can be assigned to a container independently) or class-constrained (e.g., pages are grouped permanently into equivalence classes, and the pages in one class are normally all assigned to locations on the same container).

Other example storage systems may provide for tabulated data placement with class-constrained pages. For discussion, the pages are referred to as partitions, and the equivalence classes are referred to as slices. In one example, the placement map is decomposed into a distribution table that provides which container holds the on-container pages for each class and a set of partition tables, one partition table per container, which provides for where each page is located on the container.

In one embodiment, the compartmentation module 120 divides the volumes into logical compartments. In one example, each volume belongs to exactly one compartment, and each compartment has associated with it a data compartmentation policy provided by the compartmentation module 120 that applies to all volumes in that compartment. The placement policy applies to the placement of storage for new volumes in that compartment, to increments of storage added to those volumes, and to migrations of data for those volumes via the data recovery module 150. Migrations of data are performed by the data recovery module 150, for example, in response to device or container losses. In one example, a normal mode of operation of the system 100 is that all data placement is performed in policy, meaning that the placement policy is obeyed.

In one embodiment, some operations may permit data placements to be temporarily out of policy (i.e., that the placement policy may be not be obeyed temporarily). One example is that designated slices may be treated as a temporary exception to the placement policy. Another example is that the placement policy itself might be changed, and the corresponding changes that are required to bring the data placement map back in-policy can only be performed by the placement map module 140 at the pace at which data is migrated from container to container. Out-of-policy placement may be used for compromising on the compartmentation benefit of the embodiments for the purpose of improving the transient handling of other aforementioned changes.

In one embodiment, the protection policy, the compartmentation policy, and the balancing policy describe attributes of the behavior in placing data, and may not correspond to separately identifiable components in the system 100. In one example, the protection policy provides the requirement that the set of on-container pages for a stripe are placed in accordance with the requirements of the data protection scheme implemented by the data protection module 110. In one example, the requirements of the data protection scheme include the requirement that all pages in a stripe are on separate containers. In another example, if a storage system implementing the system 100 has multi-container failure domains (i.e., where a single component fault causes multiple containers to be lost concurrently), then an additional requirement is implemented that all pages in a stripe belong in separate failure domains.

In one embodiment, the compartmentation module 120 implements a compartmentation policy for a compartment that restricts which pairs of containers that may be used in conjunction for storing the storage symbols for any stripe of a volume in that compartment. In one example, the compartmentation policy might be materialized as a list of such allowed pairs. If the placement map module 140 implements a tabulated placement map that is class-constrained, then the compartmentation policy might additionally be materialized in a container assignment for each class such that the constraints are met. In this example, the system 100 provides the operational benefit that the compartmentation policy need not be consulted directly on every placement operation.

In one embodiment, an important feature of the compartmentation policy implemented by the compartmentation module 120 is that the allowed pairs for two compartments are disjointed. In one example, a pair of disks that is permitted for use by one compartment may not be used by another compartment. Therefore, compartmentation of data loss against container pair failures is achieved for all data whose placement is in policy.

In one embodiment, the balancing policy implemented by the balancing module 130 selects which containers should be used to store a given stripe, or for a class-constrained placement which containers should be used to store a given set of stripes whose members are in the same equivalence classes. In one example, the balancing policy may be required to approximate an optimal balance of utilization across all the system's containers while using a placement that is in policy. In one implementation, an allowed pair set for a compartment is constructed so that an equal utilization of all containers is possible for each compartment, up to the quantization limits determined by the number of stripes or classes to be placed. In another example, equal utilization may not be provided as there may be circumstances (e.g., after multiple container failures) where the allowed pair set might reach a state where equal utilization is not possible (e.g., if there are no pairs that include a specified container).

In one embodiment, the system 100 not only provides that data is preserved across container failures, but also provides for restoration into an equivalent operating state after such failures. The loss of one or more containers means that the on-container pages on those containers are lost. This also means that any container pairs for which a lost container is one of the members is no longer usable. In one example, the data objects are updated to reflect the changes to the storage system implementing system 100 due to container failures. In one example, system 100 removes the lost on-container pages from the placement map, and the lost container pairs are removed from the allowed pair sets for the compartments. Due to the removal of pages, the updated data placement is out of policy for the protection policy implemented by the data protection module 110. The removal of disk pairs results in the compartmentation policies being changed, and also that the placement strategies must also be changed correspondingly.

In one embodiment, the requirements for recovery implemented by the data recovery module 150 are that the placement be brought in policy regarding the protection policy by re-replication; that the placement be brought in policy regarding the new compartmentation policy implemented by the compartmentation module 120 by re-compartmenting; and that placement is rebalanced according to the updated balance policy by the balancing module 130 by rebalancing. In one example, re-replication, re-compartmenting and rebalancing includes reading of data from containers and writing data to containers, and may include computations that are performed on the data by the data protection module 110.

In one embodiment, the procedures for re-replication, re-compartmenting, and rebalancing depend on the construction of the logical compartments. In one example, construction of the logical compartments is provided by partitioning the set of containers into disjoint sets in different ways. In this example, a logical compartment comprises a plurality of container subsets, which are disjoint with one another, and a placement policy, which includes a compartmentation policy and a balance policy both based on the container subsets. The members of the container subsets are physical storage containers. In this example, the compartmentation policy provided by the compartmentation module 120 for the logical compartment is such that the storage symbols for a stripe must be contained entirely in any single container subset belonging to the logical compartment. For a given container subset, the intra-subset placements are those placements that place the storage symbols for a stripe only on physical storage containers contained in the subset. In this example, the compartmentation policy permits all of the intra-subset placements from all of the container subsets of the logical partition, and it does not permit any other placements. The placement of storage symbols also conforms to the protection policy aspect of the placement policy.

In this example, a balancing policy provided by the balancing module 130 governs how many stripes are placed according to each permitted placement. In one implementation, stripes are assigned to the placements associated with each container subset in proportion to the number of containers in that container subset; and container subsets may have unequal sizes. The storage symbols of a stripe are assigned to containers with uniform frequency, subject to any constraints from the protection policy provided by the data protection module 110.

In one embodiment, each pair of logical compartments has the property of limited intersection with respect to each other. The property of limited intersection means the maximum number of physical storage containers in the intersection between a container subset from one compartment and a container subset from the other does not exceed the fault tolerance level. In one example, a first logical compartment has limited intersection with a second logical compartment if for any first container subset associated with the first logical compartment and any second container subset associated with the second logical compartment the number of physical storage containers contained in the intersection of the first container subset with the second container subset does not exceed the fault tolerance level. In one embodiment, it is advantageous if all pairs of logical compartments have limited intersection because it provides for strong data loss independence between them for the most important circumstances of physical storage container loss.

In one embodiment, the data protection module 110 constructs each logical compartment L from container subsets that are safe container subsets with regard to the protection policy. The meaning of safe is that every intra-subset placement from the container subset is permitted by the protection policy. In one example, if the protection policy causes a stripe to be represented with M storage symbols, then any selection of M different containers from within the container subset, in any order, will constitute a placement permitted by the protection policy.

In one example, the protection policy permits use of any combination of containers within one disjoint set T.

In one example, for logical compartments L comprising only safe container subsets T, the condition of disjointness is met if and only if the container subsets T have no overlapping pairs. That is, the intersection of any two distinct disjoint sets T may not contain any containers, or only contain one container, but must not contain more than one container.

In one embodiment, if a container subset T is a safe container subset T, then the balancing policy provided by the balancing module 130 for on-container pages in the safe container subset T is such that stripes are distributed with equal frequency over all possible n-tuples of containers in the safe container subset T, where n is the stripe size.

In another embodiment, a logical compartment may contain a container subset that is not a safe container subset. This means that the protection policy includes rules that are not satisfied by ensuring that each storage symbol is on a different physical storage container. In one example, the system includes multi-container failure domains and the protection policy includes a requirement that no more than one storage symbol of a stripe may be placed in one multi-container failure domain, and further, at least one container subset has two containers from one multi-container failure domain. In one example, there are some combinations of containers within the disjoint set T that are disallowed as part of the protection policy provided by the data protection module 110 (e.g., a particular combination of containers may be in the same failure domain; it may not be possible to achieve balanced use of containers by placing whole stripes, etc.). In one example, as a result of the protection policy provided by the data protection module 110, it is permissible for non-safe container subsets T to overlap in more than one container, if it turns out that the containers in the overlap cannot be used in pairs for data placement.

In one embodiment, logical compartments L are constructed by grid sectioning as described herein. The logical compartments are based on the assignment of containers into a grid with r rows and p columns, where p is a prime number and r is less than or equal to p. In one example, every container is assigned to a cell, and the number of containers assigned to a cell is at most the fault tolerance level. The number assigned per cell may vary across the grid, and empty cells may exist. In this example, the containers are referenced by i, j according to the assignment to row i and column j by the compartmentation module 120. A collection of $p^2$ container subsets T is defined by $T_{q,k} = \{d_{i,j} : iq + j \approx k \bmod p\}$, where q is a number between 0 and (p−1), inclusive, k is a number between 0 and (p−1), inclusive, and d represents a container. For example, with q=0 and k=3, the container subset $T_{0,3}$ consists of the containers recorded in column 3 of the grid. Values of q other than 0 identify subsets which are diagonal slices through the grid, with slopes determined by the value of q.

The grouping of the container subsets T into logical compartments L is defined by $L_q = \{T_{q,k} : k = 0, \ldots p-1\}$.

In one embodiment, the compartmentation policy provided by the compartmentation module 120 for each logical compartment is constructed from the intra-subset placements of these container subsets as described above. In one example, it may be shown mathematically that the plurality of container subsets that are contained by a single logical compartment labeled as $L_q$ are disjoint with one another. When container subsets from two different logical compartments are compared, in general they are not distinct, but their intersection consists of only the physical storage containers assigned to a single cell of the grid (this is based on the fact that p is a prime number). The number of members in the intersection is no larger than the fault tolerance level. This means that the logical compartments constructed in this way all have the property of limited intersection.

In another example, logical compartments may be constructed by grid sectioning as in the previous example, and another logical compartment is added. The additional logical compartment, called herein a horizontal logical compartment $L_H$, comprises horizontal disjoint sets $T_{H,k} = \{d_{k,j}\}$ (i.e., each horizontal disjoint set $T_H$ contains all the containers in a given row of the grid. The horizontal logical compartment has the property of limited intersection with the other logical compartments.

In one embodiment, there are no multi-container failure domains in the storage system, and the container subsets for all logical compartments constructed by grid sectioning including the horizontal logical compartment are safe container subsets.

In another embodiment, there are multi-container failure domains in the storage system, and logical compartments L are constructed by system 100 by grid sectioning excluding the horizontal logical compartment. Further, the grid is assembled with the additional condition that all containers in a single failure domain are assigned to cells in the same row of the grid. If this is done, then all the container subsets constructed this way (excluding the horizontal container subsets) are safe.

Figure 2:
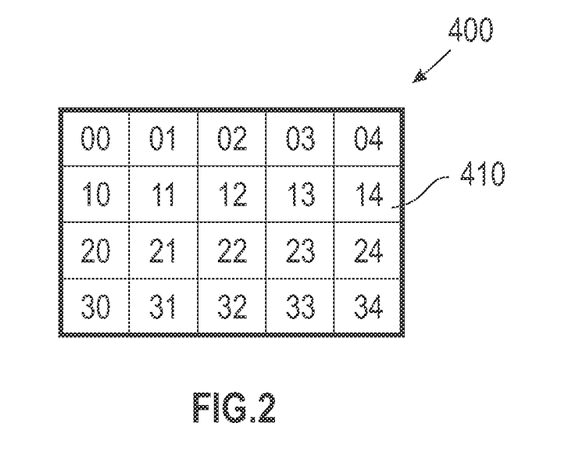
FIG. 2 illustrates a block diagram of an example 20 disk system utilizing data placement for loss protection, in accordance with an embodiment of the invention.

In one embodiment, selection of r and p and assigning of containers into the grid may be performed with different characteristics by system 100. For example, the selection may be based on the storage system implementing system 100. In one example, in a storage system including twenty (20) containers (e.g., 20 disk drives), one example is to select p=5 and r=4 and assign the containers to a 4×5 grid 400 as illustrated in FIG. 2. As illustrated, the example 4×5 grid includes grid cells 410 that are labeled as illustrated with numbers (e.g., identification numbers, names, etc.) based on row and column position. The example 4×5 grid 400 yields the following six logical compartments L, one of which is the horizontal logical compartment $L_H$:

(00 10 20 30)(01 11 21 31)(02 12 22 32)(03 13 23 33) (04 14 24 34)

(00 11 22 33)(01 12 23 34)(02 13 24 30)(03 14 20 31) (04 10 21 32)

(00 12 24 31)(01 13 20 32)(02 14 21 33)(03 10 22 34) (04 11 23 30)

(00 13 21 34)(01 14 22 30)(02 10 23 31)(03 11 24 32) (04 12 20 33)

(00 14 23 32)(01 10 24 33)(02 11 20 34)(03 12 21 30) (04 13 22 31)

$L_H$=(00 01 02 03 04)(10 11 12 13 14)(20 21 22 23 24)(30 31 32 33 34).

In one example, if there are no failure domains to consider then the six logical compartments L listed above constitute a valid compartmentation, with the logical compartments L comprising safe sets. If the containers are associated into four failure domains, each containing 5 containers, then the arrangement above is valid, and the first five logical compartments L (excluding $L_H$) will be logical compartments of safe sets. It should be noted that the association into failure domains may be determined by storage system design, for example, by which containers are on a common power supply or communications bus. Therefore, in one example, the system 100 may not be free to choose the failure domains.

Figure 3:
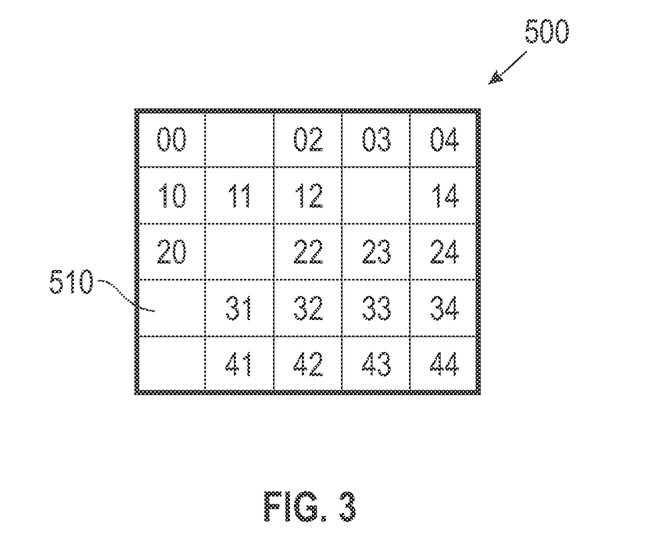
FIG. 3 illustrates a block diagram of an example 20 disk system associated with five failure domains utilizing data placement for loss protection, in accordance with an embodiment of the invention.

In another example, if the containers are associated into five (5) failure domains, each containing four (4) containers, the choice may be made to select p=5 and r=5 and assign the containers to a 5×5 grid 500 as illustrated in FIG. 3. As illustrated, the grid cells 510 are referenced based on column and row placement, where five (5) failure domains shown as empty grid cells 510. This layout yields the following logical compartments L:

(00 10 20) (11 31 41) (02 12 22 32 42) (03 23 33 43) (04 14 24 34 44)

(00 11 22 33 44) (12 23 34) (02 24 41) (03 14 20 31 42) (04 10 32 43)

(00 12 24 31 43) (20 32 44) (02 14 33) (03 10 22 34 41) (04 11 23 42)

(00 34 42) (14 22 43) (02 10 23 31 44) (03 11 24 32) (04 12 20 33 41)

(00 14 23 32 41) (10 24 33 42) (02 11 20 34 43) (03 12 44) (04 22 31)

Note in this example, the protection policy implemented by the data protection module 110 precludes use of the horizontal logical compartment [$L_H$=(00 02 03 04) (10 11 12 14) (20 22 23 24) (31 32 33 34) (41 42 43 44)] as a logical compartment.

In the example for the grid illustrated in FIG. 3, the container subsets have unequal size, which does not interfere with successful operation of compartmentation by the compartmentation module 120. In some examples, a more nearly equal distribution of container subsets sizes may be preferable.

Figure 4:
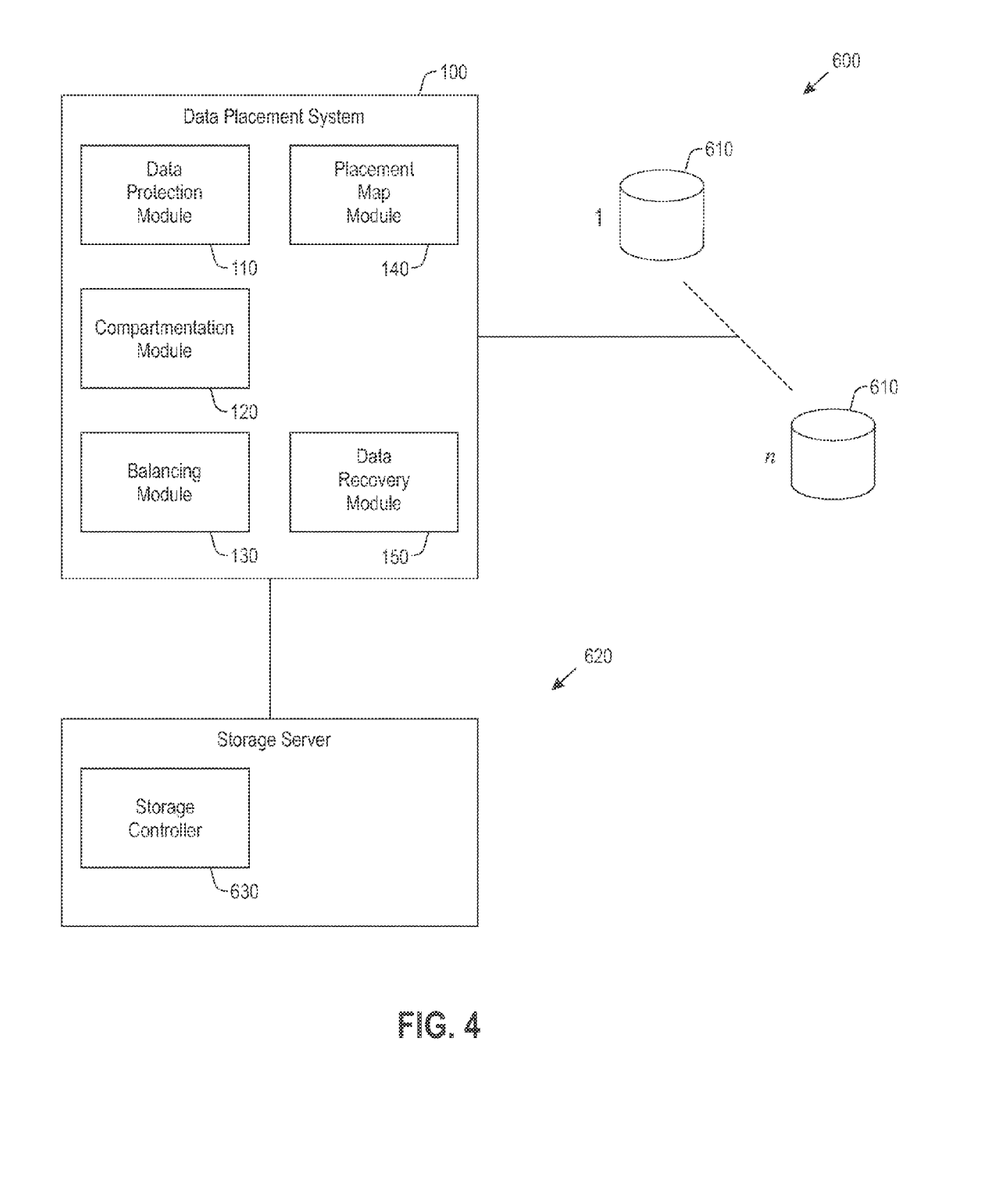
FIG. 4 illustrates a block diagram of a storage system utilizing data placement for loss protection, in accordance with an embodiment of the invention.

FIG. 4 illustrates a block diagram of a storage system 600 that implements the data placement system 100 according to one embodiment. In one example, the storage system 600 includes the data placement system 100, storage containers 610 1-n, and a storage server 620, including a storage controller 630. In one embodiment, if the data in the storage system 600 is distributed with compartmentation, using logical compartments defined using logical compartments L containing only safe container subsets, and a container 610 is lost from the system (e.g., fails), the data placement system 100 defines a new set of logical compartments that is defined by removing the lost container 610 from the container subsets containing the lost container 610 and removing all pairs including the lost container 610 from the allowed pairs in each logical compartment L. The new set of logical compartments remains a set containing only safe container subsets. In one example, the new compartmentation policy and new balancing policy may be provided in a similar way as for the original set of logical compartments by the compartmentation module 120 and the balancing module 130, respectively. In one embodiment, the new placement policy related to the original placement policy, such that it permits exactly those stripe placements that were permitted in the original placement policy, except for those that would have used the lost container 610, which are not permitted. In one embodiment, system 100 may be implemented in system 600 in the storage server 620, in the storage controller 630, or in any other device or memory within system 600. In one embodiment, the functionality of the data protection module 110, the compartmentation module 120, the balancing module 130, the placement map module 140 and the data recovery module 150 may be implemented in the storage controller 630 or the storage server 620 in hardware, software, firmware, etc.

In one embodiment, every disjoint set has at least two surviving members. In one example, the new balancing policy may achieve a balanced use of all containers, in all logical compartments L. The new balancing policy calls for a different proportion of stripes to be placed in each disjoint set T as one compartment has been lost from one disjoint set T in each logical compartment L, while the other container subsets in the same logical compartment L have maintained their membership. The balancing policy within each disjoint set T (of placing stripes uniformly across all combinations) remains unchanged.

In one example, after the container loss the data placement is not in policy for the protection policy provided by the data protection module 110 as redundant copies of pages have been lost due to the container loss. Therefore, in one embodiment, a re-replication of surviving on-container pages is required, and re-balancing and re-compartmentation may also be required. In one example, re-replication, re-balancing and re-compartmentation may be achieved using a combination of data movements in the categories of intra-disjoint set T re-replication, stripe out-migration, and split out-migration.

In one example, intra-disjoint set T re-replication is provided by the data recovery module 150 and includes making a new copy of the surviving on-container page, which resides on a survivor member of a disjoint set T of the lost container, onto another survivor member of the disjoint set T of the lost container. This yields an intact stripe in the same disjoint set T where it originally resided. In one example, stripe out-migration is provided by the data recovery module 150 and includes: making copies of the surviving on-container page onto two surviving containers that are on the same disjoint set T as one another, but not on the disjoint set T of the lost container; and deleting the surviving copy from the original disjoint set T. This yields an intact stripe in a different disjoint set T from where it originally resided. In one example, split out-migration is performed by the data recovery module 150 and includes the process of stripe out-migration separated into two parts. The first part is to perform out-of-disjoint set T re-replication (i.e., to make one copy of the surviving on-container page onto a surviving containers, which is not on the disjoint set T of the lost container. At that point, the stripe is in policy for the protection policy, but is not in policy for the compartmentation policy. The second part is to make a second copy onto a second container on the new disjoint set T and to delete the copy from the original disjoint set T.

In one embodiment, an optimal sequence of data movements depends on the storage system objectives. In one example, it may be necessary to perform out-migration to achieve rebalancing, which may be needed to ensure performance balance in system utilization. In another example, simple re-replication (intra-disjoint set T or out-of-disjoint set T) requires less write Input/Output (I/O) operations than complete out-migration, and is therefore a faster way to restore data redundancy. In one implementation, if re-replication is performed first, then additional I/O operations may be performed later to complete out-migration.

In one embodiment, the system 100 may require re-partitioning after a container fails. For example, if any disjoint set T has only one surviving member, no allowed container pairs, or no way to achieve balanced distribution across all containers, then re-partitioning is necessary (i.e., the logical compartment L membership needs to be reconstituted). In one example, for an initial logical compartment L set constructed via the grid-diagonal method described above, if there were not too many vacancies in the initial assignment and if there have not been too many container failures, it may be sufficient to compute a new logical compartment set L from the same grid after a small number of containers are exchanged with vacancies. That process leaves the container subsets and logical compartment L mostly intact, but moves those particular container to different container subsets. The new logical compartment set carries with it new logical compartments with new policies and strategies, and the old distribution will not be in policy against the new policies. Therefore, in one embodiment a set of stripe out-migrations and other similar operations will be required for re-compartmentation and rebalancing. In this embodiment, the amount of data movement that results is proportional to the number of containers that are reassigned.

In one embodiment, the benefit from compartmentation may be proportional to the number of logical compartments. In one example, the compartmentation module 120 provides that compartmentation has a large enough number of compartments. In another example, the container subsets are large enough to accommodate at least one container loss without a need for re-partitioning. This means the size of each disjoint set T may be at least the stripe size plus one (e.g., 3 for simple replication), plus two (e.g., 4 for simple replication), etc.

In one embodiment, if there are no failure domain restrictions to consider, an approach in determining the parameters of the grid-diagonal method is to select a candidate value of p as the smallest prime such that ($p^2$) is greater than or equal to the number of containers in the storage system, and then choose r as small as possible to accommodate the containers. In one example, it may be worthwhile to also consider larger primes as candidate values of p if they yield a grid with fewer vacancies and as a result a smaller dispersion of disjoint set T sizes. In one example, the larger values of p yield a larger number of compartments but a smaller disjoint set T size.

In one embodiment, if there are failure domain restrictions to consider, and the failure domains are of uniform sizes, selection of a value for p that accommodates a small number of whole failure domains per row of the grid, subject to the constraint that the minimum disjoint set T size ends up large enough to support the failure domain restrictions.

Figure 5:
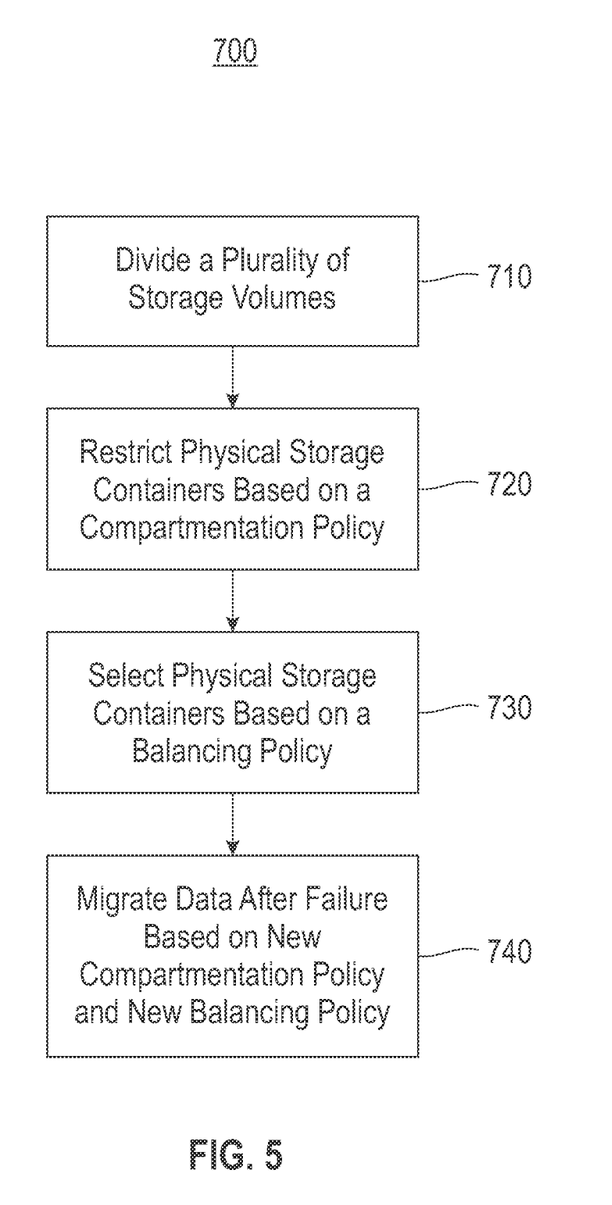
FIG. 5 is a block diagram showing a process for data placement for loss protection in a storage system, in accordance with an embodiment of the invention.

FIG. 5 illustrates a flowchart of an example process for data placement 700 according to one embodiment. In process block 710, multiple storage volumes of storage containers are divided into fixed-size pages, for example, by the compartmentation module 120 of system 100 shown in FIG. 1. In process block 720, physical storage containers are restricted based on a compartmentation policy that is provided, for example, by the compartmentation module 120 of system 100. In process block 730, physical storage containers are selected based on a balancing policy that is provided, for example, by the balancing module 130 of system 100. In process block 740, after one or more storage container failures, data is migrated to or from the remaining storage containers by, for example, the data recovery module 150 of system 100. In one embodiment, the data migration is based on a new compartmentation policy and a new balancing policy.

Figure 6:
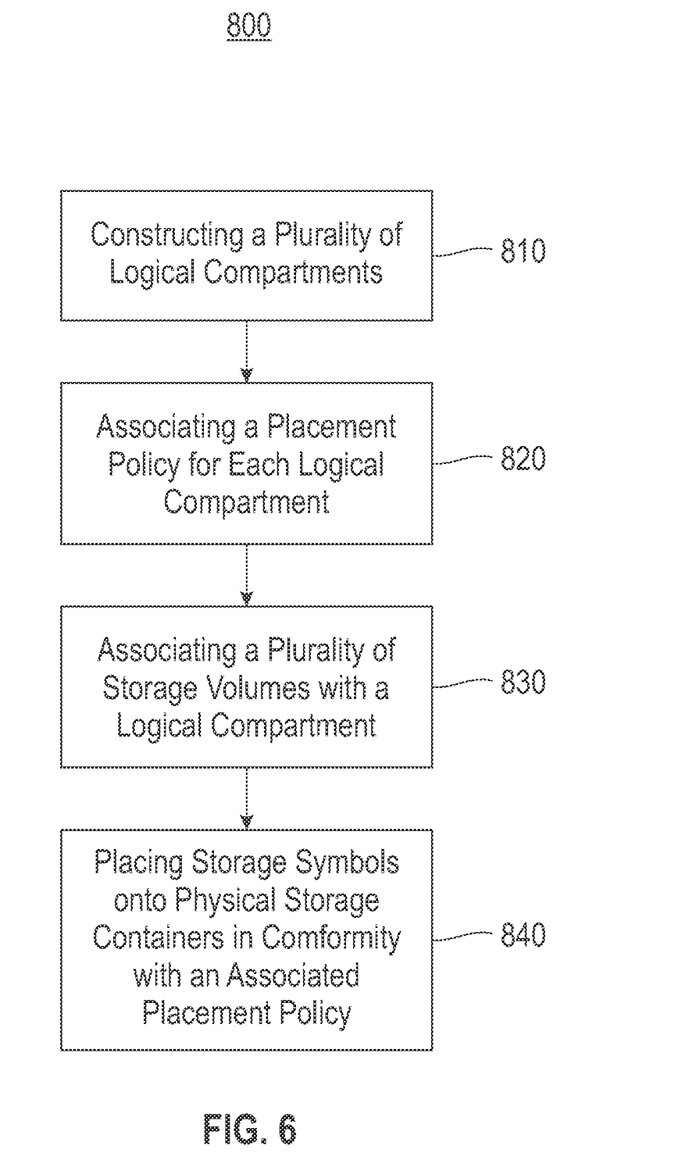
FIG. 6 is a block diagram showing another process for data placement for loss protection in a storage system, in accordance with an embodiment of the invention.

FIG. 6 illustrates a flowchart of an example process for data placement 800 according to one embodiment. In process block 810, multiple logical compartments are constructed, for example, by the compartmentation module 120 of system 100 shown in FIG. 1. In one embodiment, the constructed logical compartments include a first logical compartment and a second logical compartment. In one example, the first logical compartment is container-overlapped with respect to the second logical compartment, and the first logical compartment is data loss independent with respect to the second logical compartment. In process block 820, a placement policy is associated for each logical compartment, for example, by the system 100. In process block 830, each of a plurality of storage volumes is associated with a logical compartment, for example, by the compartmentation module 120 of system 100. In process block 840, the storage symbols that represent a data stripe are placed onto physical storage containers in conformity with the placement policy associated for the logical compartment containing the data stripe, for example, by the placement map module 140 of system 100.

Figure 7:
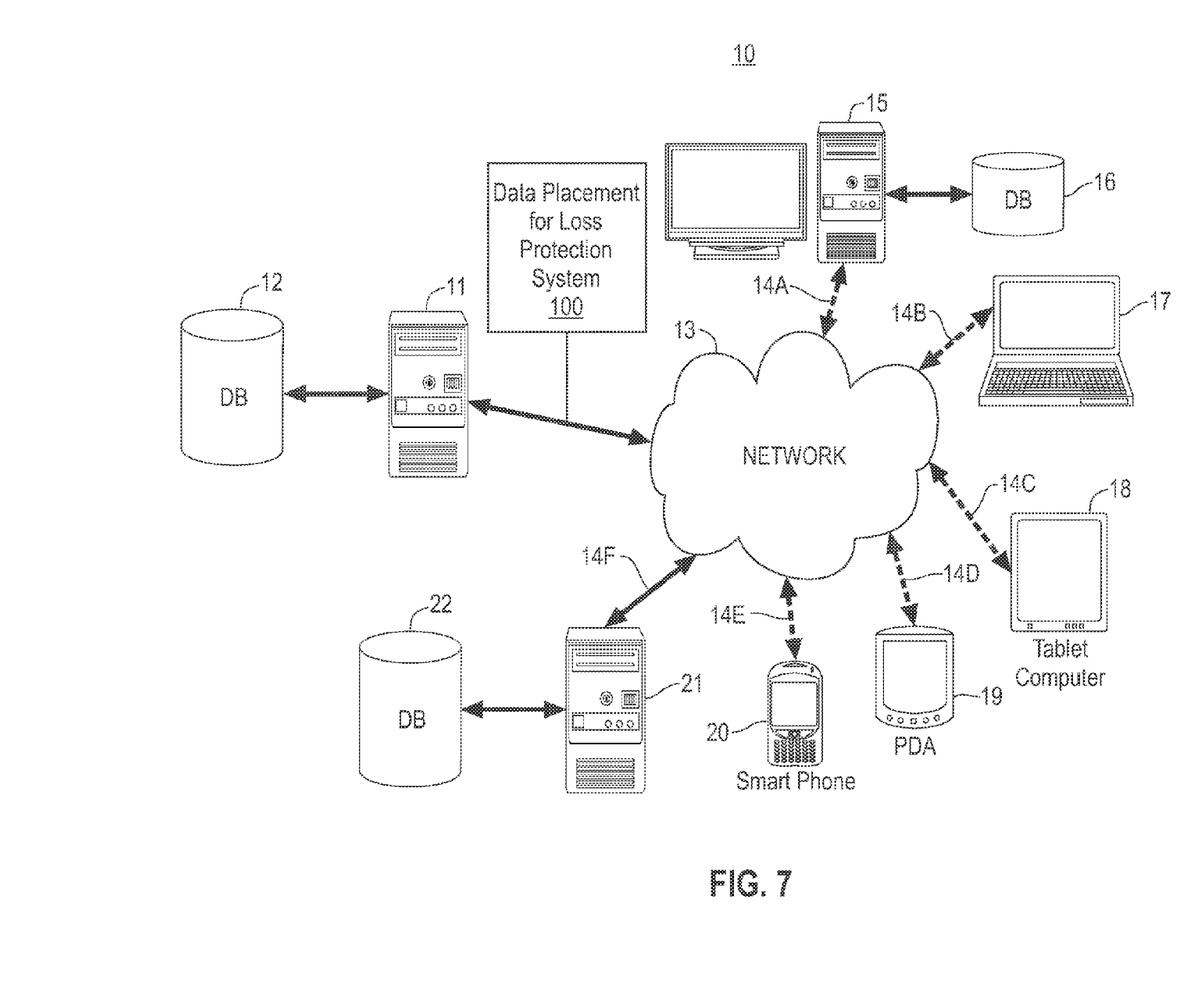
FIG. 7 is a block diagram illustrating an example of a network environment for data placement for loss protection, according to an embodiment of the present invention.

FIG. 7 illustrates an example of the basic components of an information technology system 10 utilizing data placement for loss protection system 100 that implements compartmentation and balancing policies, according to an embodiment of the present invention. The information technology system 10 includes a server 11 and remote devices 15 and 17-20 that may utilize the system 100 of the present invention.

Each of the remote devices 15 and 17-20 has applications and can have a local database 16. Server 11 contains applications, and is connected to a database 12 that can be accessed by remote device 15 and 17-20 via connections 14(A-F), respectively, over a network 13. The server 11 executes software for a computer network and controls access to itself and database 12. The remote device 15 and 17-20 may access the database 12 over the network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices and the like. Included with each remote device 15 and 17-20 is an ability to request relevant material from a large collection of documents via search queries to the server 11. Thus, when a user at one of the remote devices 15 and 17-20 desires to access the system 100 and the database 12 at the server 11, the remote device 15 and 17-20 communicates over the network 13, to access the system 100, the server 11 and database 12.

Third party computer systems 21 and databases 22 can be accessed by the server 11 in order to provide access to additional collections of documents and/or search indexes. Data that is obtained from third party computer systems 21 and database 22 can be stored on server 11 and database 12 in order to provide later access to the user on remote devices 15 and 17-20. It is also contemplated that, for certain types of data, the remote devices 15 and 17-20 can access the third party computer systems 21 and database 22 directly using the network 13.

Figure 8:
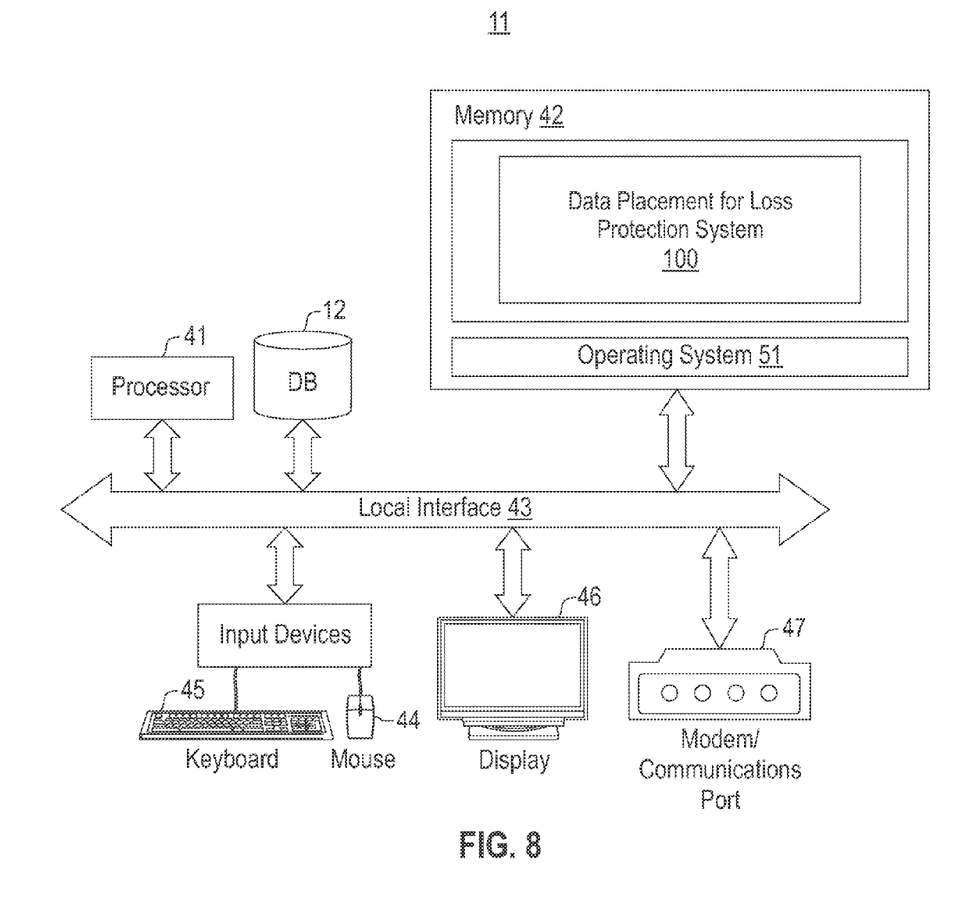
FIG. 8 is a block diagram illustrating an example of a server including a system utilizing data placement for loss protection, according to an embodiment of the present invention, as shown in FIG. 7.

The system 100 utilizes a process for data placement for loss protection, according to an embodiment of the invention. Illustrated in FIG. 8 is a block diagram demonstrating an example of server 11, as shown in FIG. 7, utilizing the system 100 according to an embodiment of the present invention. The server 11 includes, but is not limited to, PCs, workstations, laptops, PDAs, palm devices and the like. The processing components of the third party computer systems are similar to that of the description for the server 11 (FIG. 8).

Generally, in terms of hardware architecture, as shown in FIG. 8, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 8, the software in the memory 42 includes a suitable operating system (O/S) 51 and the search system 100 of the present invention. The system 100 comprises functional components and process blocks described further below.

The operating system 51 essentially controls the execution of other computer programs, such as the system 100, and provides scheduling, input/output control, file and data management, memory management, and communication control and related services. However, the system 100 of the present invention is applicable on all other commercially available operating systems.

The system 100 may comprise a source program, executable program (object code), script, or any other entity comprising a set of computer program instructions to be performed. When the system 100 is a source program, then the program is usually translated via a compiler, assembler, interpreter, or the like, which may or may not be included within the memory 42, so as to operate properly in connection with the O/S 51. Furthermore, the system 100 can be written as: (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

When the system 100 is implemented in software, as is shown in FIG. 8, it should be noted that the system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote devices 15 and 17-20 are similar to the description of the components for server 11 described with regard to FIG. 8. The remote devices 15 and 17-20 are referred to as remote devices 15 for the sake of brevity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of data placement for loss protection in a storage system comprising:
   constructing, using a hardware processor, a plurality of logical compartments, each logical compartment comprising a placement policy including a set of storage placement rules for placement of storage symbols into a set of physical storage containers, wherein a first logical compartment of said plurality of logical compartments is container-overlapped with respect to a second logical compartment of said plurality of logical compartments, and said first logical compartment is data loss independent with respect to said second logical compartment;
   associating each of a plurality of storage volumes with a logical compartment; and
   placing, using the hardware processor, the storage symbols that represent a data stripe onto physical storage containers in conformity with the placement policy associated with the logical compartment containing the data stripe.

2. The method of claim 1, wherein said first logical compartment further being majority-container-overlapped with respect to said second logical compartment.

3. The method of claim 1, wherein said first logical compartment further is fully container-overlapped with respect to said second logical compartment.

4. The method of claim 1, further comprising migrating or reconstructing storage symbols for a stripe into new physical storage containers in conformance with the placement policy that applies to the stripe.

5. The method of claim 4, further comprising migrating or reconstructing storage symbols for a stripe into new physical storage containers for conforming to a change in the placement policy that applies to the stripe.

6. The method of claim 1, wherein said first logical compartment is associated with a first plurality of disjoint container subsets, and containing as a compartmentation policy the intra-subset placements of all container subsets, and said second logical compartment is associated with a second plurality of disjoint container subsets, and containing as compartmentation policy the intra-subset placements of all its container subsets, and wherein said first logical compartment having a property of limited intersection with said second logical compartment.

7. The method of claim 6, said first plurality of disjoint container subsets and said second plurality of disjoint container subsets is constructed by grid sectioning.

8. The method of claim 1, further comprising generating and storing a placement map.

9. A computer program product for loss protection in a storage system, the computer program product comprising:
  a computer readable storage medium having computer readable program code embodied therewith, the computer readable program code comprising:
    computer readable program code configured to construct a plurality of logical compartments, wherein each logical compartment comprising a placement policy including a set of storage placement rules for placement of storage symbols into a set of physical storage containers, wherein a first logical compartment of the plurality of logical compartments is container-overlapped with respect to a second logical compartment of the plurality of logical compartments, and said first logical compartment is data loss independent with respect to said second logical compartment;
    computer readable program code configured to associate each of a plurality of storage volumes with a particular logical compartment; and
    computer readable program code configured to place the storage symbols that represent a data stripe onto physical storage containers in conformity with the placement policy associated with the logical compartment containing the data stripe.

10. The computer program product of claim 9, wherein said first logical compartment further is majority-container-overlapped with respect to said second logical compartment.

11. The computer program product of claim 9, wherein said first logical compartment further is fully container-overlapped with respect to said second logical compartment.

12. The computer program product of claim 9, further comprising generating and storing a placement map as metadata.

13. The computer program product of claim 10, further comprising migrating or reconstructing storage symbols for a stripe into new physical storage containers in conformance with the placement policy that applies to the stripe.

14. The computer program product of claim 9, further comprising migrating or reconstructing storage symbols for a stripe into new physical storage containers for conforming to a change in the placement policy that applies to the stripe.

15. The computer program product of claim 13, wherein said first logical compartment is associated with a first plurality of disjoint container subsets, and containing as a compartmentation policy the intra-subset placements of all container subsets, and said second logical compartment is associated with a second plurality of disjoint container subsets, and containing as compartmentation policy the intra-subset placements of all its container subsets, and wherein said first logical compartment having a property of limited intersection with said second logical compartment.

16. The computer program product of claim 15, wherein said first plurality of disjoint container subsets and said second plurality of disjoint container subsets is constructed by grid sectioning 17. A storage system comprising:
  a storage controller device that constructs a plurality of logical compartments in one or more memory devices, each logical compartment comprising a placement policy including a set of storage placement rules for placement of storage symbols into a set of physical storage containers in the storage system, wherein a first logical compartment of the plurality of storage compartments is container-overlapped with respect to a second logical compartment of the plurality of storage compartments, and said first logical compartment is data loss independent with respect to said second logical compartment; the storage controller further associates each of a plurality of storage volumes with a logical compartment, and places the storage symbols that represent a data stripe onto physical storage containers in conformity with the placement policy associated with the logical compartment containing the data stripe.

18. The storage system of claim 17, wherein said first logical compartment further is majority-container-overlapped with respect to said second logical compartment, and said first logical compartment further is fully container-overlapped with respect to said second logical compartment.

19. The storage system of claim 18, that the storage controller further migrates or reconstructs storage symbols for a stripe into new physical storage containers in conformance with the placement policy that applies to the stripe.

20. The storage system of claim 19, wherein the storage controller further migrates or reconstructs storage symbols for a stripe into new physical storage containers for conforming to a change in the placement policy that applies to the stripe, said first logical compartment is associated with a first plurality of disjoint container subsets, and containing as a compartmentation policy the intra-subset placements of all container subsets, and said second logical compartment is associated with a second plurality of disjoint container subsets, and containing as compartmentation policy the intra-subset placements of all its container subsets, and wherein said first logical compartment having a property of limited intersection with said second logical compartment, and said first plurality of disjoint container subsets and said second plurality of disjoint container subsets is constructed by grid sectioning.

* * * * *